(12) United States Patent
McHugh

(10) Patent No.: US 7,244,180 B2
(45) Date of Patent: Jul. 17, 2007

(54) GEOGRAPHY GAME SHOW

(76) Inventor: Garnet McHugh, 5 Spencer Ct., Morris Plains, NJ (US) 07950

( * ) Notice: Subject to any disclaimer, the term of this patent is extended or adjusted under 35 U.S.C. 154(b) by 598 days.

(21) Appl. No.: 10/719,274

(22) Filed: Nov. 21, 2003

(65) Prior Publication Data

US 2005/0113170 A1    May 26, 2005

(51) Int. Cl.
*A63F 9/24*       (2006.01)
*A63F 13/00*    (2006.01)
*H04N 7/173*    (2006.01)

(52) U.S. Cl. .......................................... 463/40; 725/24
(58) Field of Classification Search ................. 463/40; 434/350; 725/136; 273/430–432
See application file for complete search history.

(56) References Cited

U.S. PATENT DOCUMENTS

| | | | | |
|---|---|---|---|---|
| 5,002,491 A | * | 3/1991 | Abrahamson et al. ....... | 434/322 |
| 5,088,739 A | | 2/1992 | Mitchell ...................... | 273/248 |
| 5,108,115 A | | 4/1992 | Berman et al. .............. | 273/439 |
| 5,193,818 A | | 3/1993 | Leeson ........................ | 273/430 |
| 5,513,852 A | | 5/1996 | Robinson .................... | 273/431 |
| 5,545,088 A | | 8/1996 | Kravitz et al. ................ | 463/40 |
| 5,562,460 A | | 10/1996 | Price ............................ | 434/433 |
| 5,743,745 A | | 4/1998 | Reintjes ....................... | 434/307 |
| 5,833,468 A | * | 11/1998 | Guy et al. .................... | 434/350 |
| 5,916,024 A | | 6/1999 | Von Kohorn ................ | 463/40 |
| 6,171,188 B1 | | 1/2001 | Elstner ......................... | 463/40 |
| 6,174,237 B1 | | 1/2001 | Stephenson .................. | 463/42 |
| 6,267,379 B1 | * | 7/2001 | Forrest et al. .............. | 273/431 |
| 6,340,159 B1 | | 1/2002 | Giangrante .................. | 273/272 |
| 6,384,868 B1 | | 5/2002 | Oguma ........................ | 348/564 |
| 6,439,997 B1 | | 8/2002 | Brasseur et al. ............. | 463/40 |
| 2001/0036865 A1 | * | 11/2001 | Neal, III ...................... | 463/42 |
| 2002/0016196 A1 | | 2/2002 | Orak ............................ | 463/9 |
| 2002/0083436 A1 | | 6/2002 | Fidler .......................... | 725/22 |
| 2002/0125637 A1 | | 9/2002 | Leis ............................. | 273/272 |
| 2002/0162117 A1 | * | 10/2002 | Pearson et al. ............. | 725/109 |
| 2002/0165777 A1 | * | 11/2002 | Lotvin et al. ................ | 705/14 |

* cited by examiner

*Primary Examiner*—Robert Pezzuto
*Assistant Examiner*—Sunit Pandya
(74) *Attorney, Agent, or Firm*—Ernest D. Buff + Associates, LLC; Ernest D. Buff; Dave Narasimhan

(57) ABSTRACT

A multi-media geography game show allows real time participation of contestants, live show audience participants and remote TV viewers having Internet connections. Answers to questions related to geography provided within an allotted time period qualify participants for monetary or material rewards, together with learning credits. The learning credits may be converted to college credits by taking appropriate validation tests from accredited educational institutions that have made arrangements with the geography game show. The responses of contestants, live show audience participants and remote TV viewers, as well as the rewards and the leaning credits, are electronically processed and appropriate credits are issued using print outs or magnetic media.

13 Claims, 1 Drawing Sheet

GEOGRAPHY GAME SHOW

BACKGROUND OF THE INVENTION

1. Field of the Invention

The present invention relates to a geography game show; and more particularly to a game show wherein questions concern geography with emphasis on learning, the geography show including contestants, a live show audience, and remote TV viewers that interact with the game show, thereby acquiring monetary consideration and learning credits.

2. Description of the Prior Art

A number of game show themes are known in the prior art; the principle emphasis of these themes is entertainment. Even shows which have educational value do not provide for live audience participation or remote TV viewers in the game show in a manner that fosters learning. The more conventional aspects of game shows are described in greater detail hereinafter.

U.S. Pat. No. 5,088,739 to Mitchell discloses a game having an environmental theme. The players work together to solve environmental crisis problems selected from crisis cards. Players use a pie shaped game board, wherein an area of the world is represented using three symbolic tokens. The board has four pathways, three of which have 32 spaces, which are traveled by the players. Spaces represent land, water and sky. The fourth pathway has seven spaces. Movement is based on the rotation of a central globe with indicators pointing to different colors and eco-lottery cards. Sets of instructional cards from which the eco-lottery cards are selected consist of mother earth solution cards, grandfather sun cards and grandmother moon cards. Player movement is guided using eco-currency. A player that completes the game requirements uses the fourth pathway to reach the center of the board and win the game. Adaptation of the game for a television video game with identical features is contemplated. No disclosure is contained by the '739 patent concerning a geography-based, multimedia game show. The game provides no learning tools, since no new information is provided by the board game, other than information printed on the cards. Further, the board game provides no monetary reward or learning credit. Only active players are permitted to participate in the game, with the result that game show live audiences or remote TV viewer audience are excluded from game participation.

U.S. Pat. No. 5,108,115 to Berman et al. discloses an interactive game show and method for achieving interactive communication. Participants are able to electronically select a future outcome from a number of possibilities. The selection is made from a series of sets having two possible outcomes. Contests are won by selecting correct outcomes. A prize is shared when that outcome is realized. Home audience viewers can participate in a televised version of the game show, using telephones to communicate a series of random numbers. These random numbers effect the selection, which can lead to award of a prize. No disclosure is contained by the patent concerning a geography game show that provides an educational learning experience U.S. Pat. No. 5,193,818 to Leeson discloses an entertainment game, suitable for a parlor game, a video game or a television game. The game comprises a plurality of distinct arbitrarily selectable information units with two independently viewable sub-units. The first sub-unit is a representation of a recognizable object and the second sub-unit comprises questions and answers concerning the object represented in the first sub-unit. At first the player needs to identify the recognizable object in the front of the card to be able to roll a dice. If he is successful, he gains 5 points. The rolled dice provides a number and the question on the second sub-unit corresponding to the rolled dice number is read. If the player answers that question correctly, he gains additional points and rolls the dice again. Dice rolling terminates when a player answers the question incorrectly, rolls a previously rolled number or runs out of all the questions. The game is adaptable for a video game or a television game show with the master of ceremonies asking the questions. No disclosure is contained therein concerning a geography game show that provides an educational learning experience.

U.S. Pat. No. 5,513,852 to Robinson discloses a time-to-win game. This intellectual challenge game requires at least two players. A first player is selected on the basis of a card draw, by selecting highest value card. The selected player is asked to pick a number from 1 to 12, thereby selecting a numbered disk that reveals a question category. Three questions are projected on a screen sequentially. If the selected player answers these questions correctly, his display clock will be advanced by 15 minutes and he will receive $50 for each correct answer. Next the host asks each of the players to provide an element common to these three questions. The contestant that buzzes first is permitted to answer the question. If he answers the question correctly, his clock is advanced by five minutes, and the player receives $50. Each incorrect answer results in loss of 5 minutes on the clock. The first player to advance his clock to the 12 o'clock position wins the game round, and advances to a bonus round where he is presented with 16 questions. If a player answers 12 questions correctly during a 2.5-minute time period, he wins a jackpot prize of $12,000. If the bonus round player does not answer 12 questions correctly during the 2.5-minute time period, he is paid $25 times the number of correct answers. The game disclosed by the '852 patent is not a geography game show that provides an educational learning experience.

U.S. Pat. No. 5,545,088 to Kravitz et al. discloses a television game interactively played by telephone with a television viewing home audience. A master board has numbers, which are selected by chance at random and represent a specified portion, for example, of the last two digits of telephone numbers for members of a home viewing audience. Each time a question is correctly answered by the game player, one of these numbers from the master board is validated by a square. This validated number is also placed on a five by five-game board with randomly selected numbers. When a line is filled in on the five by five-game card by correctly answered questions, it becomes part of a filled line which is horizontal, vertical or diagonal. The viewing audience can then call the television station or be pre-registered to win a prize. A game player and studio audience that are assigned to the game board also win prizes. The '088 patent does not disclose a geography game show that provides an educational learning experience U.S. Pat. No. 5,562,460 to Price discloses a visual educational aid. A tool is thereby provided to relate similarities and differences between different topics and relationships between subtopics and topics in a logical, orderly manner similar to continents, countries, states and features like rivers in a map. This logical ordering has similarities in appearance to a geographical map, but has no connection with a real geographical map. A map is merely used to display and order similarities and contrast dissimilarities. The patent discloses a logical ordering visualization tool which uses map like elements to group similar concepts within a region and contrast dissimilar groups as separate elements. The '460 patent does not disclose a geography game show that provides an educational learning experience.

U.S. Pat. No. 5,743,745 to Reintes discloses a device for playing back short films and/or advertising spots and/or quizzes. The device allows insertion of short films between questions and answers according to regional and supra-regional requirements. Answers provided by the contestant are stored and treated correctly in spite of the insertion of the short advertising film clip and sequences modified at will. A mechanism is thereby provided for inserting advertising clips. The stored responses from the contestants maintain the continuity of the game show, but do not provide a geography game show that provides educational learning experience U.S. Pat. No. 5,916,024 to Von Kohom discloses a system and method of playing games and rewarding successful players. Two signals are broadcast simultaneously from a TV or radio station, the first signal has a first group that broadcasts the program. A second group provides a signal transmission setting forth a task, such as answering one or more questions broadcast in the first group. The second signal is an instructional group identifying the time allocated for responding to the question, proper content and form of answer, as well as the mode for scoring. Remote program recipients use a television set and circuitry to receive the second signal to obtain instruction. The response equipment includes a keyboard and timing circuitry. Each response provided is stored and compared with acceptance criteria and correctness of response, and scored using circuits and print outs or magnetic records containing redeemable prize data. This interactive system requires specialized equipment and does not allow the user to interact with the system over the Internet. It is not a geography game show that affords an educational learning experience.

U.S. Pat. No. 6,171,188 to Elstner discloses a game device for an entertainment show for providing more dynamic image layout. A monitor wall composed of several monitors, signal sources for graphical and or textual display. A group of monitors comprising a portion of the monitor wall may be assigned to a player and may be activated to provide an optical signal when the player pushes a mechanical switch or a buzzer. The studio camera does not have to swivel back and forth between the monitor wall and the candidates since the monitor wall is right behind the candidates. No disclosure is contained by the '188 patent concerning a geography game show or means for providing an educational learning experience. Rather, the '188 patent discloses a display device within a game show.

U.S. Pat. No. 6,174,237 to Stephenson discloses a method for a game of skill tournament. This interactive computer-based system evaluates the skill level of a player. In the qualifying round the player competes against the computer. Scoring the highest number of points qualifies the player for the highest performance level, whereupon the player is given a reward. In the play off round, players reaching the same level of performance compete against the host computer. A local area network (LAN) or wide area network (WAN) provides a set time period for the competition. The player with highest score is rewarded. No disclosure is contained by the '237 patent concerning a geography game show or means for providing an educational learning experience. Instead, the '237 patent discloses a computer device that determines a player's skill level.

U.S. Pat. No. 6,267,379 to Forrest et al. discloses an electronically interactive location-based multimedia game system and a method of interaction. The game is played in rounds with a team of players participating to come up with one or more answers for a given multimedia multiple choice question involving identification, matching, oddball element recognition, linking or poling of factual data within a preset time period. The player teams may be collocated in a location-based facility or may play via the Internet. When the teams select correct answers, an indication is provided and score is maintained to determine the winning team. Such a multimedia interactive game provides no disclosure concerning a geography game show that affords an educational learning experience U.S. Pat. No. 6,340,159 to Giangrante discloses a "Double Cross" puzzle game show played by two or more players. The video game board consists of grid of squares for example, 15×15, with locations for letters and locations which are blocked out. The central square may provide video or verbal clues. The game begins with a spin to a vowel-wheel to select a vowel, which is filled in the puzzle board in its proper location. A player, selected as a controlling player, picks a clue number from a list of clues. The controlling player may answer the clue or "double cross" an opponent by challenging him to answer the clue provided. If the controlling player decides to answer the clue and does it correctly, a word is revealed. In this event, the controlling player controls the board and receives $25 times the number of letters in the word. Failure of the controlling player to answer the clue results in a loss of $25 times the number of letters in the answer. Other players may then ring in to answer the clue. If the ringing player's answer is correct, that player becomes the controlling player and receives $25 times the number of letters in the word. If no one rings, the next consecutive player becomes the controlling player. When the controlling player "double crosses" by challenging another player, the controlling player obtains an opportunity to answer the clue. A correct answer from the controlling player results in an award of three times $25 times the number of letters and the opportunity to remain as the controlling player. Failure of the controlling player answer correctly results in loss of $25 times the number of letters. In that event, the next consecutive player becomes the controlling player. The game is continued until the puzzle is complete. In the final phase, the leading player or all of the players must solve a word puzzle consisting of only two interlocking words. The game may be played on a television game show using a telephone having an Internet connection. The game may additionally be played as a board game or a video game. No disclosure is provided concerning a geography game show that affords an educational learning experience.

U.S. Pat. No. 6,384,868 to Oguma discloses a multi-screen display apparatus and video switching processing apparatus. The image screen consists of a main image, a sub image A and a sub image B. The main image is combined with sub images A and B by determining if sub images are in even field or odd field to eliminate flicker. The combined image is written into a video-storing device and read to produce a stationary or smoothly moving sub images without flicker. One of the sub images can be turned off or switched on smoothly without flicker. This multi screen display apparatus and video switching processing is not a geographic game show.

U.S. Pat. No. 6,439,997 to Brasseur et al. discloses a television/Internet game show. Internet users register and answer a questionnaire to create user profiles that are randomly selected and posted on the TV game show web page. Internet users get to vote on these profiles to select a winner. The winner receives a large monetary award during a live TV show provided by the advertisers. The winner must spend the award during a preset time period or forgo unspent portions thereof. No disclosure is provided concerning a geography game show that creates an educational learning experience. Instead, the Brasseur et al. patent discloses a lottery game having a televised award ceremony.

U.S. patent application Ser. No. 2002/0016196 to Orak discloses an Internet game show in which a visual clue is progressively exposed to contestants, providing visual clues. The contestants log onto the game show at the same time and are allowed to see the questions progressively. Questions are viewed as a stream of data from the game show host server computer. The questions may also be loaded into the contestant's computer and revealed progressively using special software. Each of the contestants fills in a blank area to provide a textual response and returns it to the game show host by activating a send button. The software returns this response with a computer-generated time stamp to account for the Internet transmission time delay. The contestant that provides the earliest correct response is the winner. Each of the contestant's computer clocks must be set to the same time, which is oftentimes not feasible. No disclosure is provided concerning a geography game show that affords an educational learning experience. Instead, the patent discloses an interactive Internet game.

U.S. patent application Ser. No. 2002/0083436 to Fidler discloses a method for a network-televised commercial-free game show in which revenue generating advertisements and entertainment are integrated. A predetermined number of contestants is selected and provided with a square game board connected and integrated with an Internet advertising support system link to the show. The square game board comprises many unlighted squares having randomly generated numbers, and a blank center square. A segment of an advertiser's commercial is shown to the contestants and to the public. Contestants must provide a response relating to the advertised product. If a correct response is provided, a light is turned on in the square game board; otherwise no light is turned on. The advertiser's commercial is displayed in its entirety. When complete array of lights in the contestant's game board is lit along a horizontal, vertical or a diagonal line, that contestant is a winner. The game show uses advertising commercials as an integral part of the show. No commercial breaks are needed. Revenue is generated from commercials as well as an Internet system link. No disclosure is provided concerning a geographic game show. The Fidler application tests the skills of contestants regarding the knowledge of advertised products.

U.S. patent application Ser. No. 2002/0125637 to Leis discloses a word game and methods for conducting the same. This word game is playable by one or more players. It comprises a plurality of syllables in text boxes with value options. When a value option is selected, a clue is provided. The player that made the selection must then come up with a word that comprises the syllables provided in the text box. Correct answers are rewarded while incorrect answers are penalized. This word game can be played as a television game. No disclosure is provided concerning a geography game show that creates an educational learning experience. The Leis application discloses a video game; not a TV game show.

Foreign Patent No. FR 2689413 to Gaston discloses an educational geographical game. Towns are noted on a map having a rectangular frame. A removable map is held by the rectangular frame. A graduated ruler pivots on the frame to show positions of towns. The removable plastic frame allows placement of maps within the frame, while the pivoted graduated ruler sweeps across the map, allowing players to note the exact positions of towns. The Gaston patent discloses recording the positions of towns within a map. However, it does not disclose a geography game show that provides an educational learning experience.

Game shows are varied in nature and provide mostly entertainment with monetary rewards primarily to the contestants. Some of the games, which use telephone connection or Internet to communicate remote participants' answers, require additional equipment or software and do not provide feedback as to the correctness of the answers. There remains a need in the art for a geography game show in which the contestants, live show audience and remote TV viewers can participate in real time and obtain monetary or material rewards and learning credits providing validation of the learning experience.

SUMMARY OF THE INVENTION

The present invention provides a multi-media geography game show that provides educational credit and permits real time participation of contestants, a live show audience and remote TV viewers connected through the Internet. The live show audience and the remote TV viewers are provided with special software that enables their participation in the geographic game show in the same manner as the contestants, records their answers, and issues material rewards as well as educational credits. The software synchronizes the time clock of every computer with the master time clock of the geography game show. The geography game show is presented in a large theater wherein three screens face the contestants and the live audience. Two additional screens, located to the left and right of the central screen, display staged performance, other video-images, and still images pertaining to the posted question. The central screen, which is directly behind the geography game show host, displays the posted question. Also displayed is the category of the posted question, which is selected from six categories or the final 'world series' round. Further displayed is the type of question. A question type is selected from a list of 'who', 'what', 'when', 'where', 'how' and 'why'. The central screen also displays the dollar/point value for the posted question. The contestants must buzz within four seconds to select the question for answering. Other multimedia screens provide pictures and video clips, which correlate with the question. Also provided are six possible answers. The contestant that selects a question must select the answer within 30 seconds. Answering the question correctly provides the reward, while answering it incorrectly penalizes the contestant by the amount of the reward. The live show audience, as well as the remote TV viewers connected through the Internet, provide their selection of answers within the 30-second period. An installed computer software program logs their answers and materially rewards correct answers.

Generally stated, the geography game show comprises a large theater having three screens behind the geography game show host. Three contestants as well as the live show audience are provided with their own computer terminals on which are loaded geography game show software that enables them to participate in the geography game show along with to the contestants. Remote TV viewers can also participate in the geography game show using the Internet by first downloading the specialized geography game show software. This software displays each of the three screens on the computer monitors of the remote TV viewers and allows them to answer the questions within the 30-second time frame. Software provided for the live show audience terminals and for the remote TV audience Internet connections records responses and issues material rewards in the form of gift vouchers, travel discounts and vouchers, service coupons or vouchers. It additionally provides learning credits based on correctly answered questions. Based on these learning credits, a learning credit report may be used to take additional tests that qualify the contestant, live show audience participant, or remote TV viewer to receive college credits from accredited learning institutions, which have made arrangements with the geography game show.

BRIEF DESCRIPTION OF DRAWINGS

The invention will be more fully understood and further advantages will become apparent when reference is had to the following detailed description and the accompanying drawing, in which.

DESCRIPTION OF THE PREFERRED EMBODIMENTS

Figure 1:
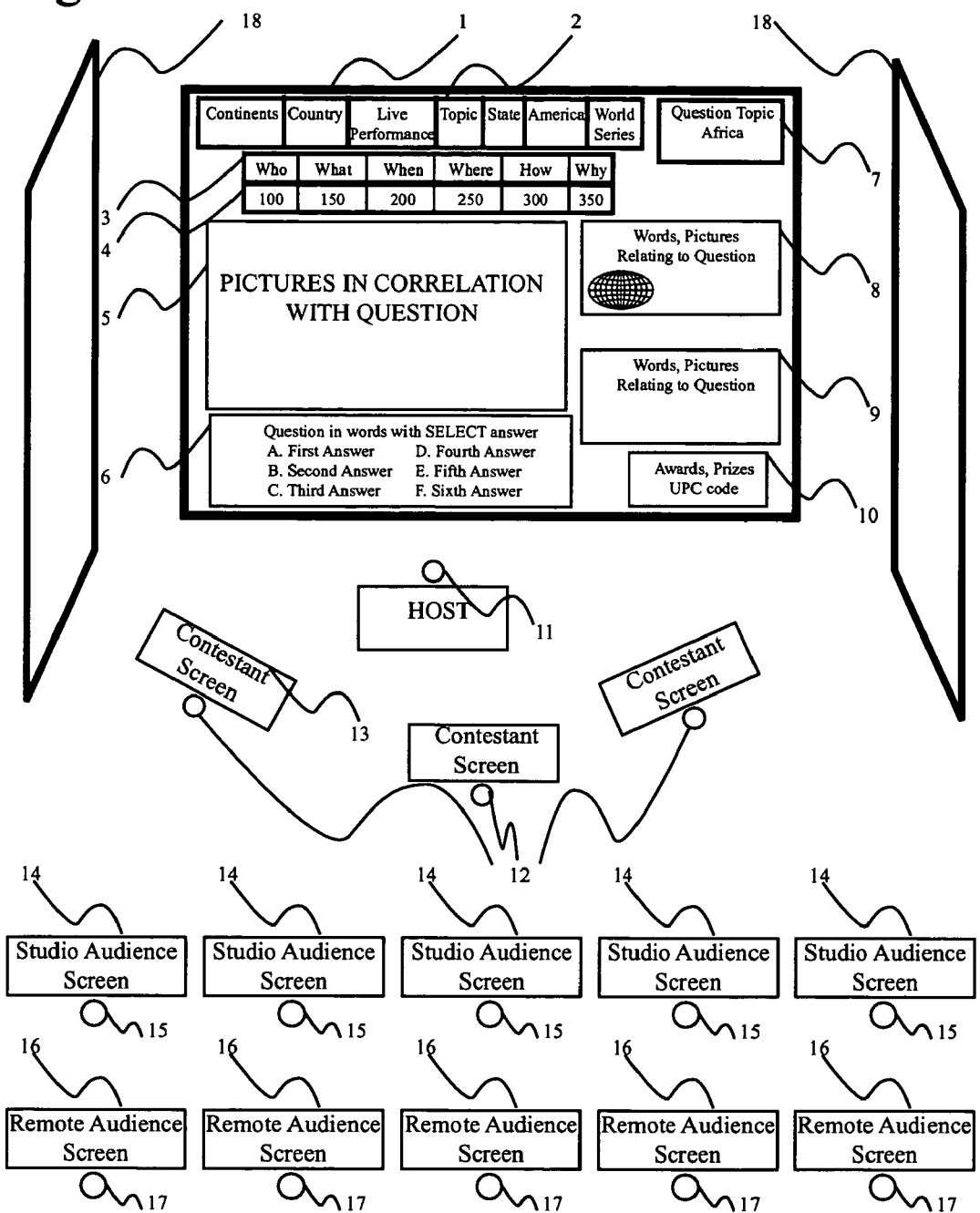
FIG. 1 is a schematic illustration of the geographic game show depicting contestants, game show host, live show audience and remote TV viewers all interacting within the game show environment, which is projected on a main screen and two adjacent side screens.

Geography is a game show wherein questions concerning a variety of subjects are asked and answered for monetary consideration. The rewards provided for contestants, live show audience may be different in kind and in quantity and may include gift catalogs, magazine subscripts, travel rewards, CD-DVD and or financial services including insurance portfolio management, etc. The live show participants as well as remote TV viewers interact with the game show using software provided within the live show or web software provided through an Internet connection. The software synchronizes the time clock of every computer with the master time clock of the geography game show. The software allows the audiences to answer questions and their scores are recorded for submission to an accredited learning institution in preparation for additional tests. Show viewers that successfully complete a test based on the show contents receive college credits. Key features and rules of the game show are listed below.

1. During the opening and closing veiling of the game show, the music of Arron Copeland's "Appalacian Spring" is performed. The duration of the game show is one hour, of which 12 minutes is to be allocated towards commercial advertising. A number of questions are posed, depending on the response time thereto by the contestants. This number tends to vary from show to show. Contestants are required to answer a question within 30 seconds, or forfeit the question, and have the score for that question subtracted accordingly.

2. A Game Show Host poses a question (the "Posted Question") to each of three (3) contestants at the same time. During this time a giant movie theater-type screen hosts an array of pictures and words pertaining to the question at hand. The screen is visible to the live show audiences and is projected for remote TV viewers or web page viewers accordingly.

3. The game show posts questions involving "who", "what", "when", "where", "how" and "why" with multiple choices for answers.

4. Questions posted are selected from six categories:
   a. Continents: Individual questions pertaining to individual places around the world. The number of questions asked is based on the response time of contestants and is at least 18 questions in all.
   b. Live Act: A staged performance is presented, followed by questions in the six categories. This presentation also hosts a "Spin of the Globe Segment".
   c. Countries: Three individual countries (republics, dominions, etc.) from around the world are chosen. Each of the three countries garners six questions.
   d. Special Topics: Three topics are chosen, each of which has 6 questions. Two topics are picked at random. A mainstay of the game is the "Health Forum".
   e. State: A state randomly chosen forms the basis for six questions. If the game is to be aired in another country, the state would be replaced by a province (France) or county (Ireland).
   f. America: Six questions of, by and/or for those items/matters that pertain to particular interests governing the United States. If the game is to be aired in another country, this segment of America would be replaced by that country and/or Republic, protectorate, dominion, principality, or the like.
   g. World Series: This playoff round hosts a topic for the final and last series of questions pertaining to virtually any subject that is selected by the writers.

5. The points/dollar amounts of the questions are in multiples of $100, $150, $200, $250, $300, $350, and the like. The scoring and/or the dollar amount received by a contestant is predicated upon the severity or complexity of a question, and upon clues given within the line of questioning.

6. Topics upon which questions are based include continents, live act, countries, topics, state, America, and "World Series" (final round).

7. After the host finishes presenting the Posted Question, the contestants have four (4) seconds to signal readiness to respond. A contestant signals readiness by pressing a personal buzzer. In the event that none of the contestants signal readiness within the 4-second time interval, a central game show buzzer is triggered, indicating that time for response to the Posed Question has elapsed.
   a. If a contestant that has signaled readiness answers incorrectly, the full amount of the assigned value for the question is deducted from his score.
   b. A contestant may press his buzzer to answer the Posted Question without waiting for the host to finish reading the question.

8. If a contestant's answer is correct, that contestant receives the full point value (or dollar amount) assigned to the question. The amount received by the contestant is based upon the severity of the question. Both live TV show audiences as well as the remote TV viewers with an Internet web connection may answer the question with their credit recorded for receiving monetary compensation as well as learning credits. The monetary compensation provided for the contestants is different from that received by live show audiences or remote TV viewers with an Internet connection.
   a. If the first contestant that buzzed is incorrect, that contestant will have deducted from his score the full point value assigned for the Posted Question. Thereafter, the question immediately becomes open to be answered by a second contestant. The second contestant's answer is subject to the same reward (or penalty) as the previous contestant. The live show audiences as well as remote TV viewers with an Internet connection do not have a second chance to answer the question since their scores are already recorded.

9. The software for interacting with the geography game show is installed in the computers connected to each of the show audience. Remote TV viewers with Internet connection download the relevant software, which logs on the person's name and identity information and records questions posed and answers provided, so that they can be submitted for monetary credits as well as learning credits. Monetary credits, which may include trips and/or prizes, are periodically interjected into the game. Other variants might include discounted trips, prizes, goods, services, rebates, and coupons. The studio audience may receive a prize if the 1$^{st}$ contestant answers correctly, or even if the 1$^{st}$ contestant answers incorrectly. The same mechanism is used to award prizes to selected members of the TV audience with Internet connection. Some of the prizes may be placed on the bottom right of the live show audiences' viewing board; or incorporated in web sites, numbers, and the like. Valued components would incorporate a corporate/product(s)/and the game shows own UPC coding or that of charitable-nonprofit and public service announcements and their help locations.

10. A bonus question is randomly interjected throughout the game show. This bonus question may be attached to the original 1st question, for example. A bonus question is assigned the same point or dollar amount as the 1st question asked, if answered correctly; but is subject to a lesser penalty (only ½ the points or dollar amount of the 1st question) if answered incorrectly. Both the live show audiences as well as remote TV viewers with Internet connection can answer the bonus question and receive credit.

11. Contestants participate in a final round, "World Series", near the conclusion of the game with a 'sudden death' character. The rules for the World Series is set forth hereinafter under feature #12.

12. The final round in which contestants participate is the "World Series". The live show audiences, as well as remote TV viewers with Internet connections, do not participate in this event.

a. Each contestant is given 6 questions on a topic.

b. There is only one answer allowed for each question posted.

c. A contestant cannot press the buzzer to answer until a red light on the screen board goes out. Otherwise the contestant forfeits the question and is further penalized by being charged with a wrong answer.

d. A contestant is allowed only two wrong answers, after which the contestant is barred from further participation in the World Series round. The score of a contestant that is so barred is frozen.

e. A contestant can deliberately answer two questions incorrectly. In such an instance, the contestant might "bet" the minimum value (typically $1.00). Such betting strategy serves as a "filibuster", to prevent others from answering and possibly advancing.

f. Up to two (2) bonus questions can, optionally, be applied during the World Series round. Bonus points are assigned on a per question basis; or dictated by the Host; or selected by a contestant.

13. A contestant that accumulates the highest score/dollar amount (less prizes) during game play is the winner.

FIG. 1 shows an arrangement of the game appointed for staging in a TV studio with a live audience and remote TV viewers. The game show host is shown at 11 in front of the main screen 1 and two side screens 18. The main screen 1 carries most of the relevant game show information, while the side screens 18 show video clips and additional information pertinent to the questions and the category in which they are resident. The main screen indicates the categories 2. The nature of the question "who", "what", "where", "when", "how", "why" is shown at 3. The dollar or point value of the question is shown at 4. The large central section 5 is devoted to pictures of the main theme in correlation with the question. The question and several possible answers are indicated at 6. Each contestant, 12 views a screen 13, having content identical to the main screen and two side screens; answers the question posed by selecting one of the answers A . . . F, and records it. Each studio audience 15 has a similar screen 14, containing content identical to the main screen and two side screens. The studio audiences also select the answers. Remote television viewers with Internet connection 17 also view the same image on their respective screens 16; make their selection; and communicate it via the Internet. The question topic is elaborated at 7. Words and pictures relating to the question are provided at 8 and 9, which are valued components that additionally comprise geographical/global locations/renderings. The prize and awards available are shown at 10. Awards may appear differently on each of the contestant's screen, the live show audience screen, and the remote television viewer screen.

In order to provide appropriate learning credit and prize rewards, contestants, the live show audience and remote television viewers must complete a form that sets forth their identity, the course they are interested in, and the learning institution they are attending. The software program resident in the game show master computer verifies arrangements that have been made and provides a report in an appropriate format, which includes category, questions posed and answers provided. This learning credit qualifies a contestant, live show audience or remote television viewer to sit for an additional examination, to obtain college credits.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A multi-media geography game show providing educational credit allowing real time participation of: contestants, live show audience participants and remote TV viewers connected to Internet, comprising:

a. a central projection screen visible to said contestants and audience participants posing a posted question;

b. two side screens projecting information relevant to the question, said projected information having in the form of video clips, still images or staged drama;

c. timing means for determining time lapsed, to ascertain that a contestant indicates readiness within 4 seconds, and that a question is answered by said contestant, live audience participants and the remote TV audience viewers within 30 seconds;

d. recording means for recording the answers provided by said contestants, live show audience participants and remote TV viewers;

e. validating means for evaluating the correctness of provided answers;

f. rewarding means for providing monetary rewards to said contestants and material rewards to said live show audience participants and remote TV viewers;

g. credit issuing means for issuing learning credits to contestants, live show audience participants and remote TV viewers, respectively, wherein said learning credits qualifies a contestant, live show audience or remote TV viewer to sit for an additional examination, to obtain college credits; and h. wherein the participation of each: contestant, live show audience participant and remote TV viewer connected to Internet, collectively, is in real time.

2. A multi-media geography game show as recited by claim 1, wherein said central projection screen comprises multiple sections providing information related to said posted question in the form of video clips, still images and staged performance.

3. A multi-media geography game show as recited by claim 1, wherein said posted question comprises "who", "what", "when", "where", "how" and "why" categories with a multiple-choice answer format.

4. A multi-media geography game show as recited by claim 1, wherein the said posted question is selected from a category consisting of "Continents", "Live Act", "Countries", "Special Topics", "State", "America", "Spin of the Globe" and a "World Series".

5. A multi-media geography game show as recited by claim 1, wherein the said live show audience participants interact with the game show using computers having specialized software.

6. A multi-media geography game show as recited by claim 1, wherein the said remote TV audience viewers interact with the game show using Internet-connected computers having specialized downloaded software.

7. A multi-media geography game show as recited by claim 1, wherein said contestants are rewarded monetarily for answering said posted questions correctly or not within said allotted time of 30 seconds.

8. A multi-media geography game show as recited by claim 1, wherein said live show audience is materially rewarded for answering said posted questions correctly or not correctly within the allotted time of 30 seconds, or not therewithin, said reward having the form of merchandise coupons, travel vouchers, service vouchers, UPC codes, help locations.

9. A multi-media geography game show as recited by claim 1, wherein said remote TV audience participants are materially rewarded in the form of merchandise coupons, travel vouchers, service vouchers, UPC codes, help locations for answering said posted questions correctly within the allotted time of 30 seconds.

10. A multi-media geography game show as recited by claim 1, wherein said rewarding means comprises a print out issued by said live show terminal or remote TV viewer computer.

11. A multi-media geography game show as recited by claim 1, wherein said rewarding means is a magnetic media issued by said live show terminal or remote TV viewer computer.

12. A multi-media geography game show as recited by claim 1, wherein said timing means comprises computer software means for synchronizing a live show audience time clock and a remote TV audience time clock with a time clock of said multi-media geography game show.

13. A multi-media geography game show as recited by claim 1, wherein depictions of geographical/global locations/renderings are provided, said depictions denoting earth's special conformity.

* * * * *